United States Patent
Patel et al.

(10) Patent No.: US 6,494,821 B1
(45) Date of Patent: Dec. 17, 2002

(54) MOVABLE ARM ACTIVATED TOOL CHANGER FOR MACHINE TOOL SYSTEM

(75) Inventors: Himat Patel, Zionsville, IN (US); Walter Bautz, Griesheim (DE)

(73) Assignee: Hurco Companies, Inc., Indianapolis, IN (US)

( * ) Notice: Subject to any disclaimer, the term of this patent is extended or adjusted under 35 U.S.C. 154(b) by 0 days.

(21) Appl. No.: 09/652,935

(22) Filed: Aug. 31, 2000

(51) Int. Cl.$^7$ .............................................. B23Q 3/157
(52) U.S. Cl. ............................. 483/49; 483/7; 483/51; 483/57; 483/61
(58) Field of Search ............................. 483/58, 61, 11, 483/12, 14, 7, 16, 17, 24, 26, 36, 57, 510, 52, 53, 38, 43, 44, 45, 49, 46

(56) References Cited

U.S. PATENT DOCUMENTS

| | | | | |
|---|---|---|---|---|
| 3,339,273 A | * | 9/1967 | Knosp | 483/46 |
| 3,667,114 A | * | 6/1972 | Smith et al. | 483/26 X |
| 3,844,028 A | | 10/1974 | Hague | |
| 4,020,545 A | * | 5/1977 | Slavinski et al. | 483/1 |
| 4,087,901 A | | 5/1978 | Lohneis et al. | |
| 4,156,962 A | * | 6/1979 | Haller | 483/46 |
| 4,358,888 A | | 11/1982 | Zankl et al. | |
| 4,359,815 A | * | 11/1982 | Toyoda | 483/14 |
| 4,428,109 A | * | 1/1984 | Seeger | 483/24 |
| 4,587,716 A | | 5/1986 | Bytow | |
| 4,654,954 A | * | 4/1987 | Bayes et al. | 483/61 X |
| 4,658,493 A | * | 4/1987 | Saeki et al. | 483/61 X |
| 4,943,199 A | * | 7/1990 | Hillen | 483/61 |
| 5,107,581 A | * | 4/1992 | Reuter et al. | 483/61 |
| 5,281,194 A | | 1/1994 | Schneider | |
| 5,749,819 A | | 5/1998 | Yan et al. | |
| 6,007,464 A | | 12/1999 | Hashimoto | |
| 6,071,220 A | | 6/2000 | Sugihara et al. | |

FOREIGN PATENT DOCUMENTS

| | | | | |
|---|---|---|---|---|
| DE | 3336232 | * | 4/1985 | 483/61 |
| DE | 19724635 | | 12/1998 | |
| DE | 29902127 | | 6/2000 | |
| EP | 0103956 | | 3/1984 | |
| EP | 0974420 | | 1/2000 | |
| FR | 2465557 | | 3/1981 | |
| JP | 45541 | * | 2/1989 | 483/61 |
| JP | 405261639 | * | 10/1993 | 483/61 |
| JP | 07060596 | | 3/1995 | |
| JP | 10080835 | | 3/1998 | |

OTHER PUBLICATIONS

Copy of International Search report for PCT Application No. US/01/2717 mailed on Mar. 28, 2002.

* cited by examiner

Primary Examiner—William Briggs
(74) Attorney, Agent, or Firm—Baker & Daniels

(57) ABSTRACT

The present invention involves a tool changer for removal and installation of tools in a machining center having a machine tool with a spindle for holding a tool disposed within the machining center frame. The tool changer comprises a tool rack having a plurality of locations for holding tools, and an arm structured and arranged to be movable between the plurality of locations and a position which is capable of accessing a spindle of the machining center. Each tool holding location farther comprises a fork, which has a plurality of prongs. The movable arm has two grippers and one of the two grippers is disposed at an angle of about 90° relative to the other of the two grippers. The movable arm also is associated with rotational, vertical, and horizontal movement mechanisms. The rotational mechanism includes a motor, a pulley associated with the motor, a belt attached to the motor and the pulley, and a gear wheel attached to the belt with a limit switch for sensing one of the locations on the gear wheel. The vertical mechanism includes a vertical shaft and a cylinder capable of moving the movable arm vertically. The horizontal mechanism includes a linear track and a cylinder capable of moving the movable arm laterally. The frame further includes an access door located proximate the tool holding locations and sized to allow for manual access to one of the tool holding locations. The access door also has at least one location for holding a tool. The tool changer further comprises a cylinder actuated door which allows for the arm to access the spindle.

13 Claims, 9 Drawing Sheets

MOVABLE ARM ACTIVATED TOOL CHANGER FOR MACHINE TOOL SYSTEM

BACKGROUND OF THE INVENTION

1. Field of the Invention

The invention relates to machine tool systems, such as machining centers, mills, and lathes. More particularly, the field of the invention involves mechanisms for replacing the tool head in the spindle of a machine tool system.

2. Background Art

A typical computer numerically controlled (CNC) machine tool system includes a machining center having a tool changing mechanism. The mechanism removes a particular tool from the machining spindle and replaces it with a different tool. With machining centers of this type, a plurality of machining operations is conducted, which can require a like number of different tools be positioned on the spindle head. Thus, prior machining systems have included a plurality of tools available for on-demand usage.

In the development of modern machining centers, considerable focus has been placed on the tool changing mechanism, i.e., the device that extracts a particular tool from the rack and places it within the operating spinal at the machining location. For instance, the automatic tool changer of Hague et al., is depicted in U.S. Pat. No. 3,844,028, is exemplary of the automatic tool changing mechanisms.

The tools may be provided in. a variety of forms. Typically, the tools are mounted on a movable component that is integrated into the numeral control system of the machining center. The tools can be controlled to move a desired tool to a predetermined location to be extracted by the automatic tool changing mechanism. One type of tool storage and retrieval mechanism is shown in FIG. 1. In particular, magazine 10 includes a plurality of tool pockets 12 that are configured to firmly grasp a tool holder. Magazine 10 depicted in FIG. 1 is a turret type mechanism in which tool pockets 12 are interconnected by drive chain 14 or similar pocket positioning mechanism. Drive chain 14 is wound around hub 15 and is driven by a motor (not shown) under direction of the numeric control system or a manual system. In operation, drive chain 14 can be incrementally driven to position specific tool pocket 12 at the tool changing location. Magazine 10 also includes housing 17 that surrounds and supports tool pockets 12, drive chain 14 and hub 15. FIG. 2 presents magazine 10 as it is connected and arranged with milling center 11.

SUMMARY OF THE INVENTION

The present invention is a tool changer with a movable arm that removes and inserts of a tool from a stationary tool rack into the spindle of a machining center.

According to the present invention, the tool changer comprises a tool rack having a plurality of locations for holding tools, and an arm structured and arranged to be movable between the plurality of locations including a position which is capable of accessing a spindle of the machining center. Each of the locations further comprises a fork that has a plurality of prongs. The movable arm has two grippers, wherein one of the two grippers is disposed at an angle of about 90° relative to the other of the two grippers.

The tool changer has rotational, vertical, and horizontal mechanisms for moving the movable arm from an arm-waiting position to a tool-gripping position. The rotational mechanism comprises a motor, a pulley associated with the motor, a belt which is attached to the motor and the pulley, and a gear wheel which is attached to the pulley. The gear of the rotational mechanism has a plurality of locations, and a sensor associated with the tool changer for sensing one of the locations on the gear, with each of the locations on the gear corresponding to one of the tools on the tool rack. The sensor associated with the tool changer is located at bottom of the tool changer.

The vertical mechanism for moving the movable arm vertically comprises a vertical shaft associated with the movable arm, and a cylinder connected to the movable arm. The cylinder is capable of moving the movable arm vertically upon the shaft. The horizontal mechanism for moving the movable arm laterally comprises a linear track associated with the movable arm, and a cylinder connected to the movable arm.

An advantage of the present invention is that the tool changer is more reliable than prior tool changers because of fewer parts in its assembly.

An advantage of the present invention is that the tool changer is lightweight and compact for handling and easily adapt to machining center with limited space.

Another advantage of the present invention is the faster time to change a tool in the spindle.

Another advantage of the present invention is that more tool racks may be easily added to the tool changer, therefore providing more tool storage and a larger variet changing capability.

Other advantages and benefits of the invention can be readily discerned from the following written description and accompanying figures.

DESCRIPTION OF THE FIGURES

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
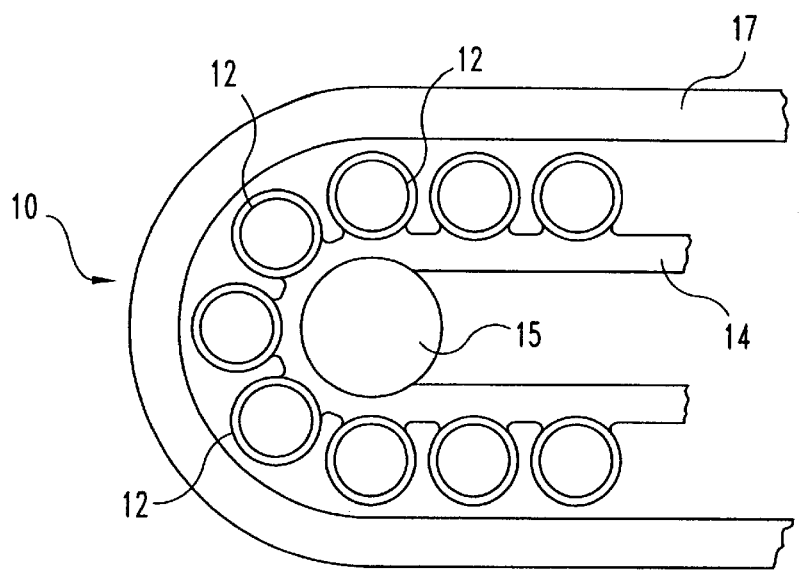
FIG. 1 is a side elevational view of a tool mechanism from prior art for an automatic machining center.
Figure 2:
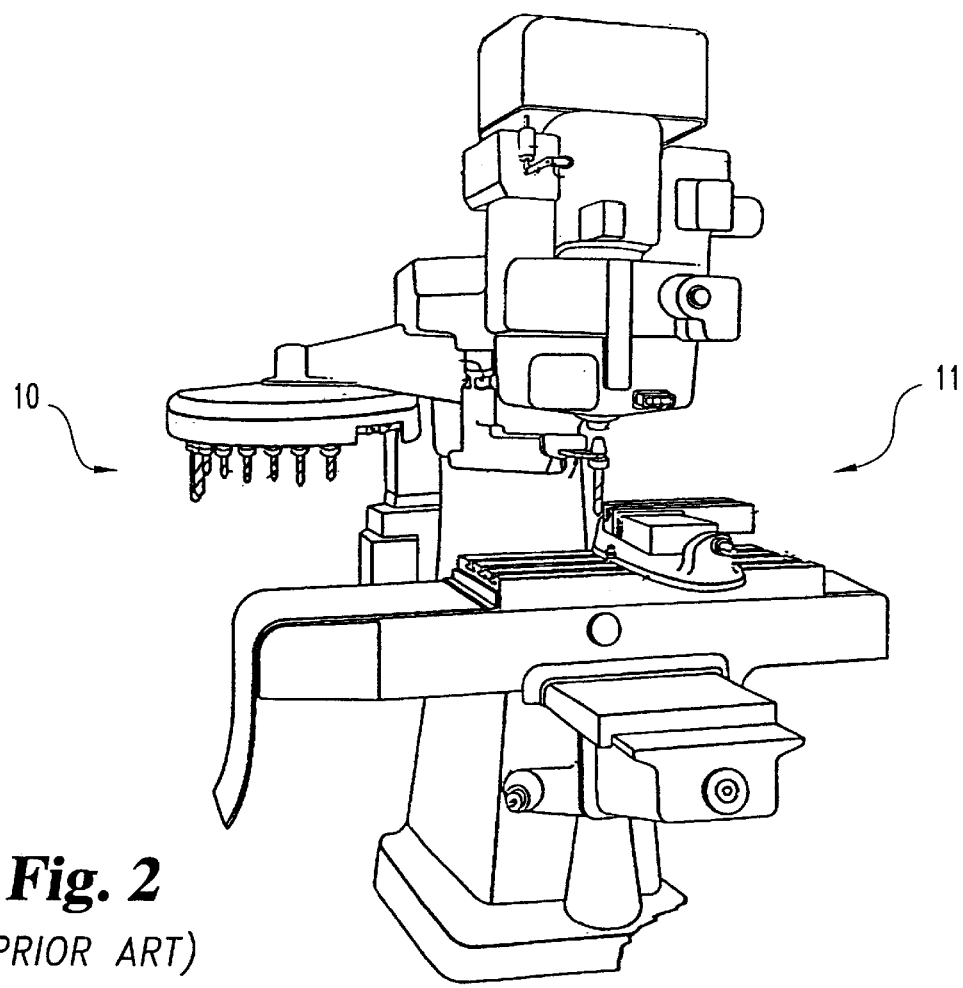
FIG. 2 is a perspective view of a vertical spindle milling machine using a tool mechanism of FIG. 1, viewed from the front and slightly to the left thereof.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF EXEMPLARY EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alternations and further modifications in the illustrated devices and described methods and further applications of the principles of the invention which would normally occur to one skilled in the art to which the invention relates.

Figure 3:
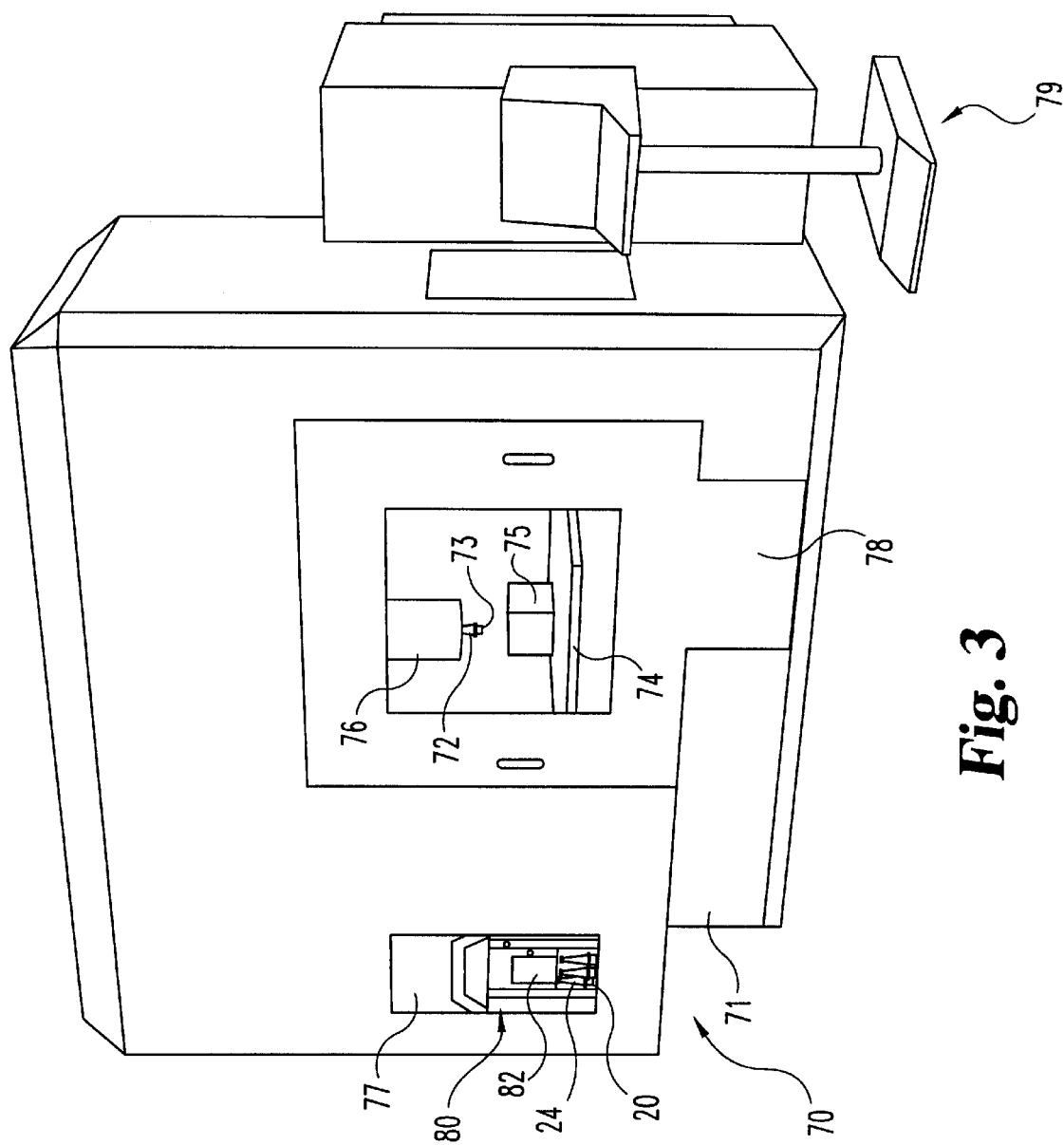
FIG. 3 is a perspective view of the movable arm activated tool changer inside a machining center according to the present invention.

FIG. 3 presents machining center 70 operably disposed within frame 71. Frame 71 contains debris within machining center 70. Machining center 70 includes spindle 72 capable of holding tool 73 for machining part 75. Table 74 is located inside machining center 70 and underneath spindle 72. Machining part 75 is placed on top of table 74 for machining, typically fastened to table 74 by hold down components (not shown). Spindle 72 is attached to main spindle motor 76 which provides the motive force for tool 73 to shape machining part 75. Screen and control panel 79, which is shown as a stand alone equipment, is either built-in, moveable or on a swiveling arm fixed to machine bed of frame 71. Tool changer 80 is installed inside frame 71 and access door 82 of tool changer 80 is adjacent door 77 of frame 71. Front side of tool changer 80 is shown with access door 82 which is for manually accessibility to tool changer 80 and exchange of tools 24 into or out of tool rack 20, including during the running time of machine center 70. Sliding door 78 is at the front of machining center 70 for enabling access to spindle 72, machining part 75 and machining area 110. Mechanical and electrical components are easily and comfortably accessible by access doors lo at the rear of the machine (not shown).

Figure 4:
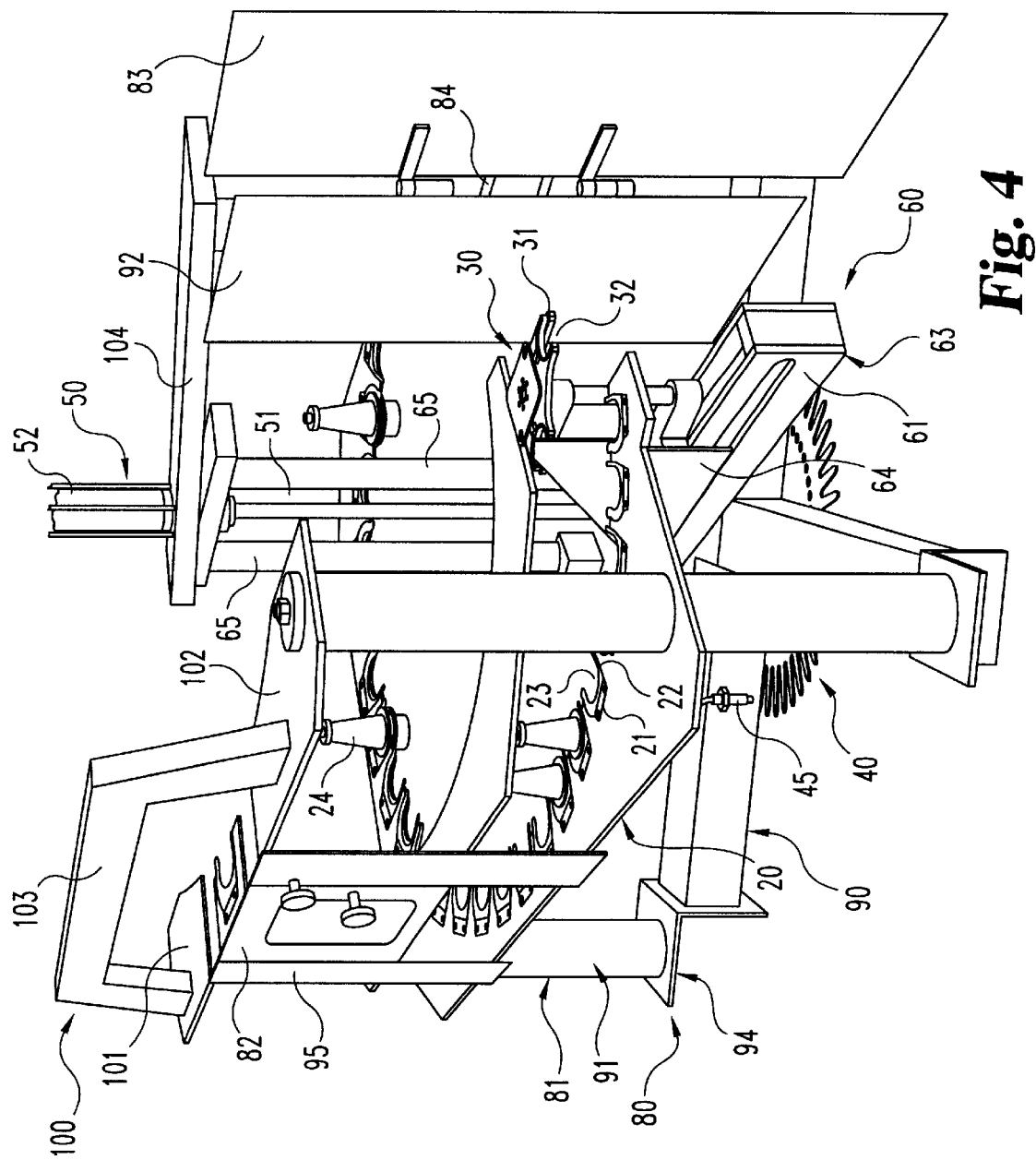
FIG. 4 is a perspective view of the movable arm activated tool changer of FIG. 3 showing with a number of tools on its tool rack according to the present invention.

As shown in FIG. 4, frame 81 of tool changer 80 is generally made of beams and columns assemblies. Frame 81 provides support for movable arm and tool rack 20 and relatively positions movable arm 30 and tool rack 20, and anchors tool changer 80 within frame 71, (shown in FIG. 3) so that movable arm 30 can access tools on tool rack 20 and interact with spindle 72. The front of tool changer 80 is shown with access door 82. The bottom of frame 81 is generally made of an assembly of four beams 90 and provides stability for tool changer 80. Four beams 90 form a X-shaped beam assembly with one end of each beam 90 converged into one point which is the center of the bottom of tool changer 80. Three vertical columns 91, two columns 91 at front of tool changer 80 and one column 91 at the right hand of tool changer 80, are welded to the bottom of tool changer 80 with each end of columns 91 being welded to the outer end of beam 90. The connection is accomplished by the use of angle plate 94 as a transition from horizontal beam 90 to vertical column 91. Tool rack 20 is sandwiched between column 91 as shown in FIG. 4.

Frame 81 also includes handle assembly 100 which is fastened to top end of two front columns 91, as shown in FIG. 4. Handle assembly 100 provides ease of transferring tool changer 80 in and out of machining center 70. Handle assembly 100 is generally made of handle 103 welded to two separated plates 101 and 102. Handle assembly 100 may be supplemented or replaced with additional tool rack 20 as shown in replacement in FIG. 10. The bottom of wall 92 is attached to a bottom beam 90, and the top of wall 92 is attached to bar 104, and the other end of which is attached to the top of vertical mechanism 50. Cylinder actuated door 83 is hinged to one side of wall 92. Two bars 95 are fastened to tool changer 80 with top end of bar 95 to lifting handle assembly 100 and bottom end of bar 95 to edge of tool rack 20. One side of access door 82 is hinged to one of two bars 95.

Tool changer 80, for removal and installation of tools in machining center 70, comprises tool rack 20 having a plurality of locations 21 for holding tools. Movable arm 30 is structured and arranged to be moveable between the plurality of locations 21 and a position which is capable of accessing spindle 72 of machining center 70. Each location 21 includes fork 22 and each fork 22 further has a plurality of prongs 23. Movable arm 30 has two grippers 31, and grippers 31 are positioned at a 90° angle relative to each other. Each gripper 31 comprises of two fingers 32 for gripping on a tool. Movable arm 30 is associated with rotational, vertical, and horizontal movement mechanisms to allow for multiple levels of tool racks 20.

Figure 5:
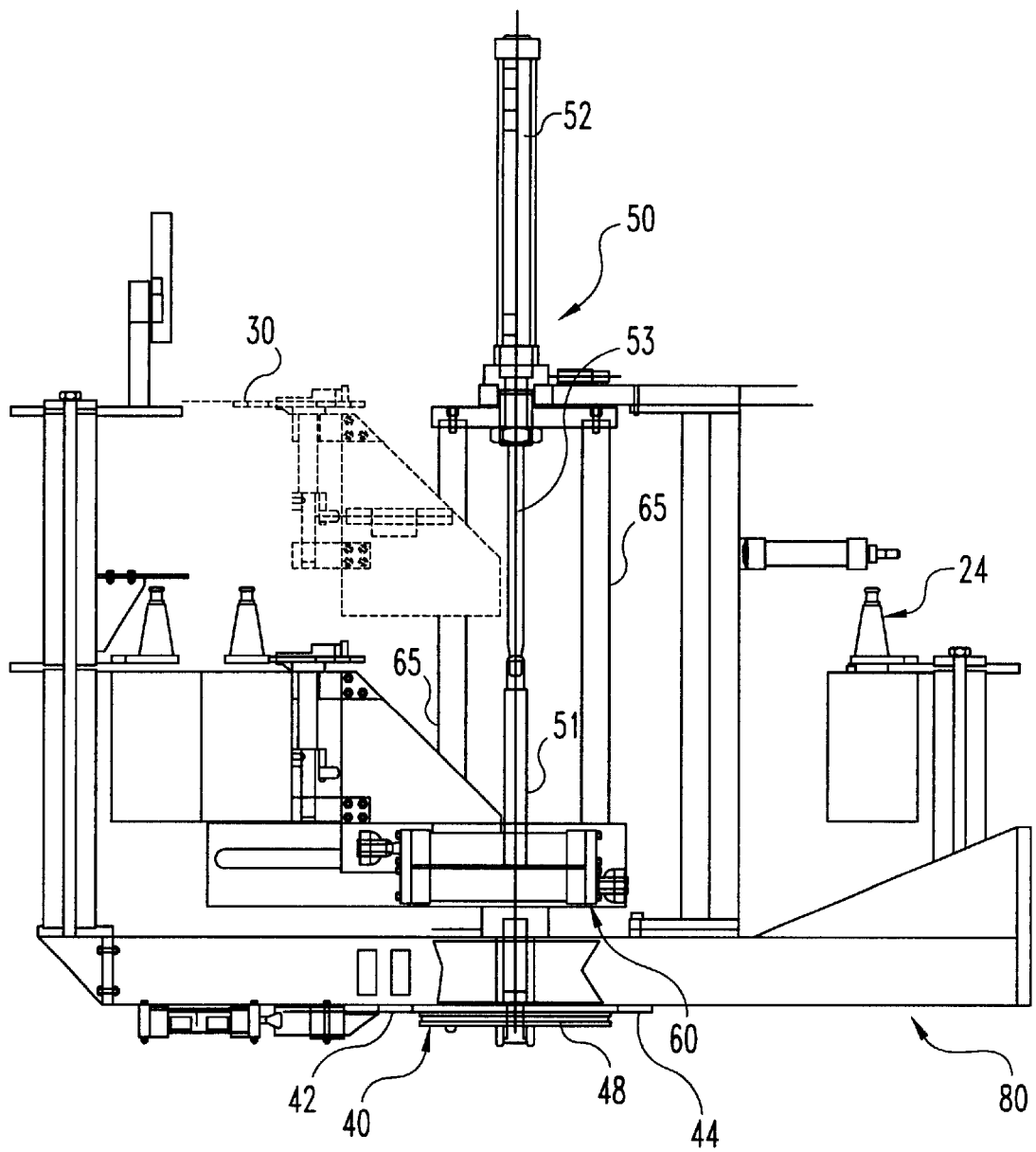
FIG. 5 is a side view of the movable arm activated tool changer with showing envelope of the vertical movement according to the present invention.

Movable arm 30 is associated with rotational mechanism 40 as shown in FIGS. 4, 5, 6a & 6b. Rotational mechanism 40 includes motor 41 which one end is attached to adapter 46. Adapter 46 is then attached to an ear 47 which is affixed to the bottom of tool changer 80. Adapter 46 has pulley 42 as shown in FIG. 5, which is rotated by the turning of the shaft of motor 41. Pulley 42 is attached to one end of belt 43. The other end of belt 43 is attached to pulley 48 of gear wheel 44. Gear wheel 44 is attached to the bottom of tool changer 80 and is rotatable about its center. The center of gear wheel 44, in this exemplary embodiment, is coincident with the center of tool rack 20. However, because of the ability of arm 30 to move in several directions, rotational mechanism 40 may be located in other locations relative to tool rack 20. Gear wheel 44 is generally disposed in a central position within tool rack 20. The surface of gear wheel 44 is generally perpendicular orientation to relative to vertical shaft 51.

Figure 6A:
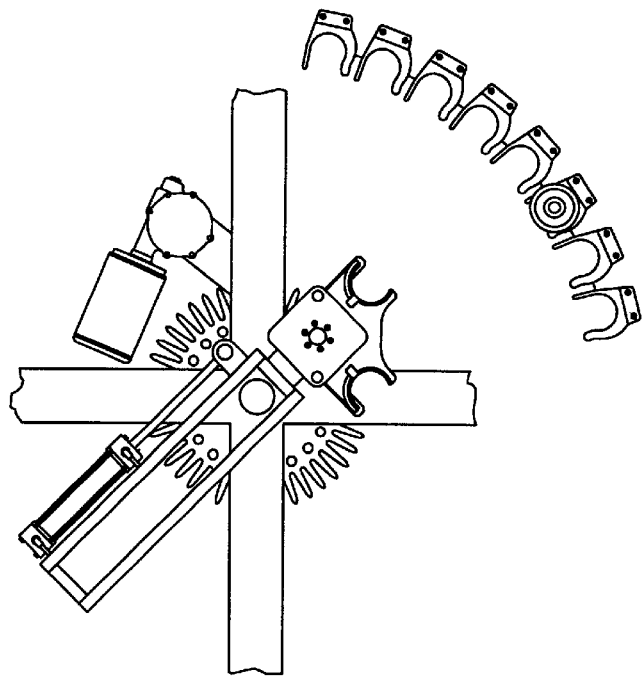
FIGS. 6a & 6b are partially enlarged top views of the movable arm activated tool changer showing progressively a sequence of events which the movable arm moves from the movable arm-waiting position to the tool-gripping position according to the present invention.
Figure 6B:
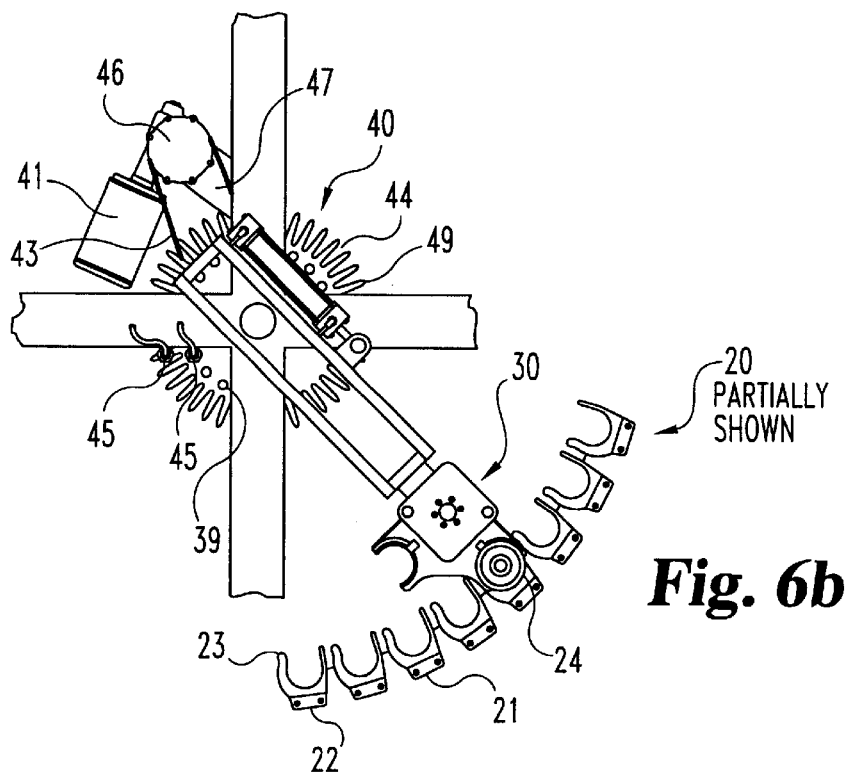

As shown in FIGS. 6a & 6b, gear wheel 44 has a plurality of teeth 49 at the outside diameter of the gear wheel 44. There is clearance between each tooth 49 and teeth 49 are generally pointed outward. The number of teeth 49 on gear wheel 44 may be corresponding to the number of locations 21 on the tool rack 20. Sensor 45 is attached to bottom of tool changer 80. With algorithmic input from the controller from machining center 70, sensor 45 is used located a particular tool on tool rack 20. Algorithmic input is determined by sensor 45 in reference to position of movable arm 30 with respect to tool 24 on locations 21 and teeth 49 of gear wheel 44. For configurations having more tool positions that the number of teeth 49, holes 39 in the gear wheel 44, or other physical indicia, may be used with one or more additional sensor(s) to have the calculation based on input from two or more sensors. When the machining center 70 is at a tool change sequence, motor 41 starts to rotate its shaft, which in turn rotates its pulley 42 on adapter 46. Pulley 42 then rotates belt 43 which then rotates pulley 48 of gear wheel 44 and turns gear wheel 44 to a determined position. Sensor 45 is calibrated so that location of tooth 49 on gear wheel 44 is corresponding to particular tool attaching to location 21 on tool rack 20.

Movable arm 30 is associated with vertical mechanism 50 as shown in FIGS. 4 & 5. Vertical mechanism 50 includes a vertical shaft 51 which is generally disposed in a central position within tool rack 20. Cylinder 52 is disposed in a general parallel orientation relative to vertical shaft 51, and has rod 53 which is operably connected to arm 30. Arm 30 is slidingly mounted on vertical shaft 51 so that when rod 53 is extended or retracted by cylinder 52, arm 30 is displaced upon shaft 51 by the corresponding distance that rod 53 is displaced. Shaft 51 may also have sensors (not shown) on either end to detect the approach of arm 30, which may be used by the machine tool controller to sense the position of, or limit the movement of, arm 30.

Tool changer 80 is associated with horizontal mechanism 60 as shown in FIGS. 4, 5, 6a, and 6b. Horizontal mechanism 60 includes linear track 61 pivoting about vertical shaft 51. Linear track 61 is also attached to two vertical columns 65 which are located on each side of vertical shaft 51. Two vertical columns 65 help to stabilize linear track 61 along the vertical moment of movable arm 30. Linear track 61 consists of assembly 63 which is horizontally slotted on its side. Assembly 63 is sandwiched between plate assembly 64. Plate assembly 64 consists of one plate on each side of linear track 61. Movable arm 30 is fastened to the inner face of each side of plate assembly 64 as shown in FIG. 4. Cylinder 62 is connected to movable arm 30 such that cylinder 62 moves movable arm 30 laterally. Therefore, movable arm 30 and plate assembly 64 move simultaneously along the horizontal slot of linear track 61.

As shown FIG. 4, tool changer 80 includes access door 82, which is located on one side of tool changer 80, for manually accessing tools in tool rack 20. Access door 82 located proximate one of plurality of locations 21 and is sized to allow for manual access to one of plurality of locations 21. Access door 82 may include an additional location 21 for holding a tool. Whenever access door 82 is closed its additional location 21 would be positioned along with locations 21 of tool rack 20. For providing access to spindle 72, cylinder actuated door 83 is attached to one side of tool changer 80. When tool changer 80 is installed inside machining center 70, cylinder actuated door 83 keeps debris from machining center 70 from entering into the compartment of tool changer 80 when cylinder actuated door 83 is closed. Cylinder actuated door 83 may be opened and closed by cylinder 84.

Figure 10:
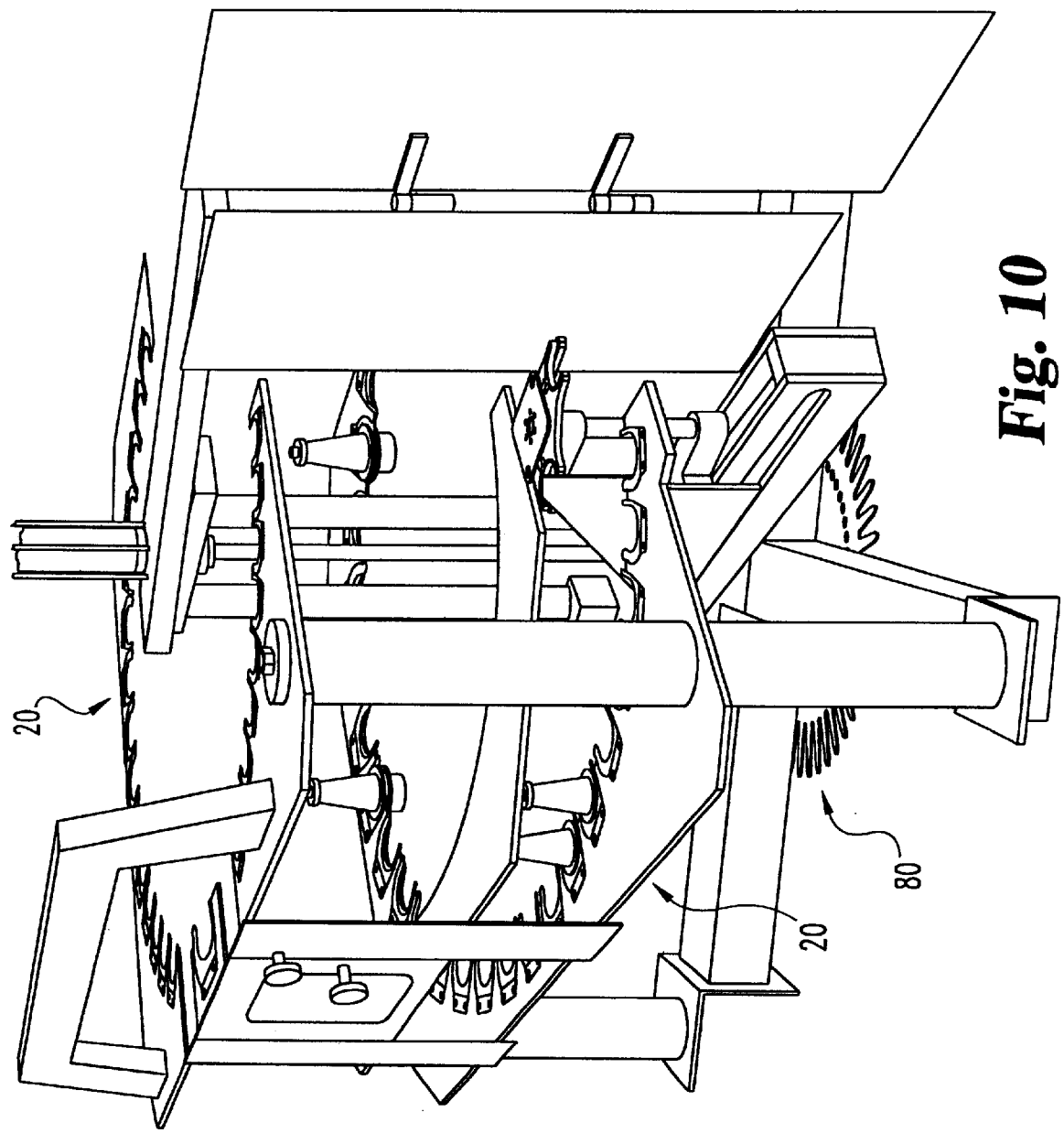
FIG. 10 is a perspective view of the arm activated tool changer with two tool racks according to the present invention.

In another embodiment tool changer 80 may include a plurality of tool racks 20. Tool racks 20 may be arranged so that each tool rack 20 is on top of other with clearance between them. FIG. 10 shows tool changer 80 with two tool racks 20. Second tool rack 20 may be installed on top of tool changer 80 with clearance between bottom rack and top rack. The amount of clearance being dependent on the size and shape of tools being stored in tool rack 20.

Figure 7:
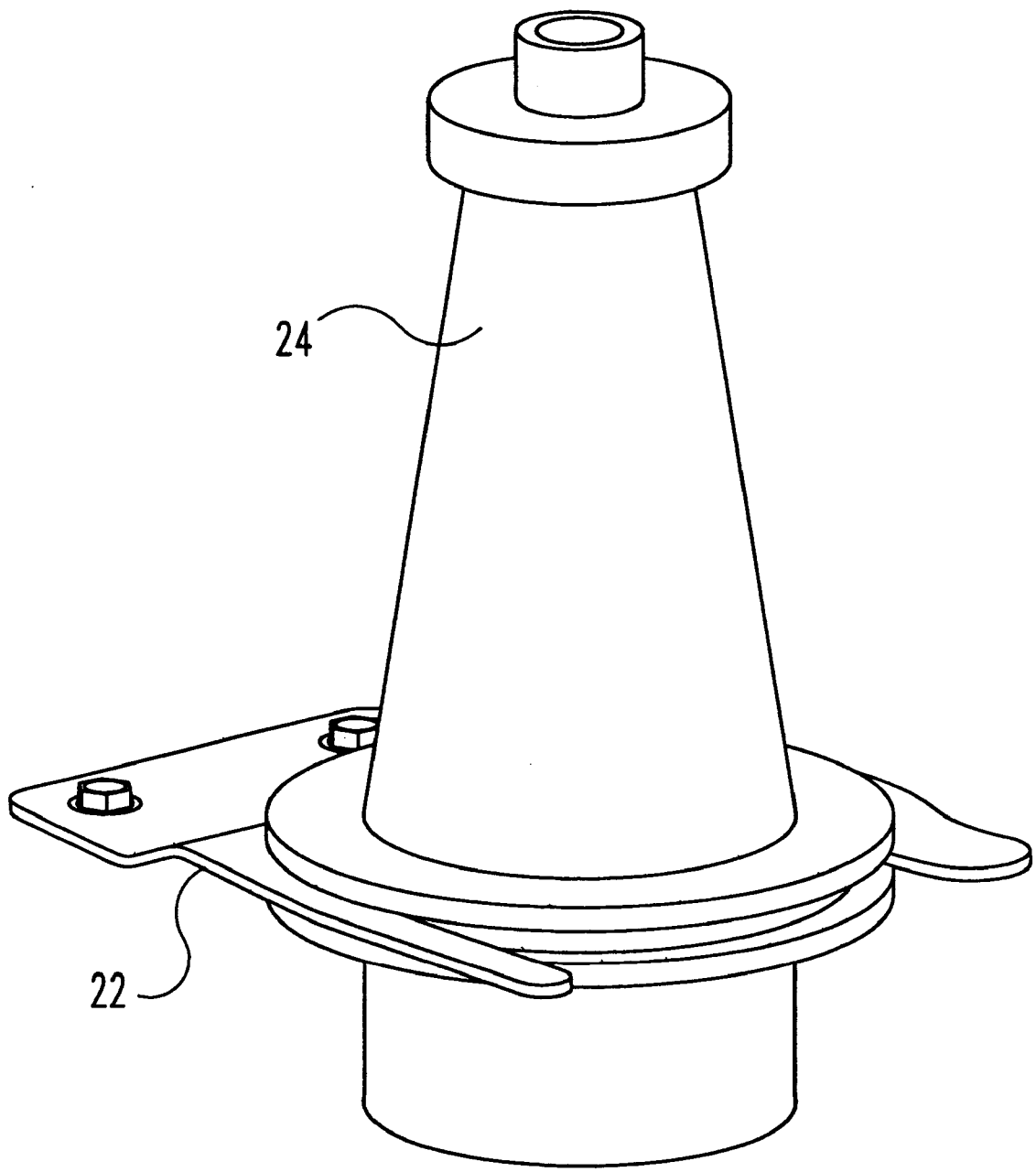
FIG. 7 is a perspective view of a fork with a tool between the two prongs of the fork according to the present invention.
Figure 8:
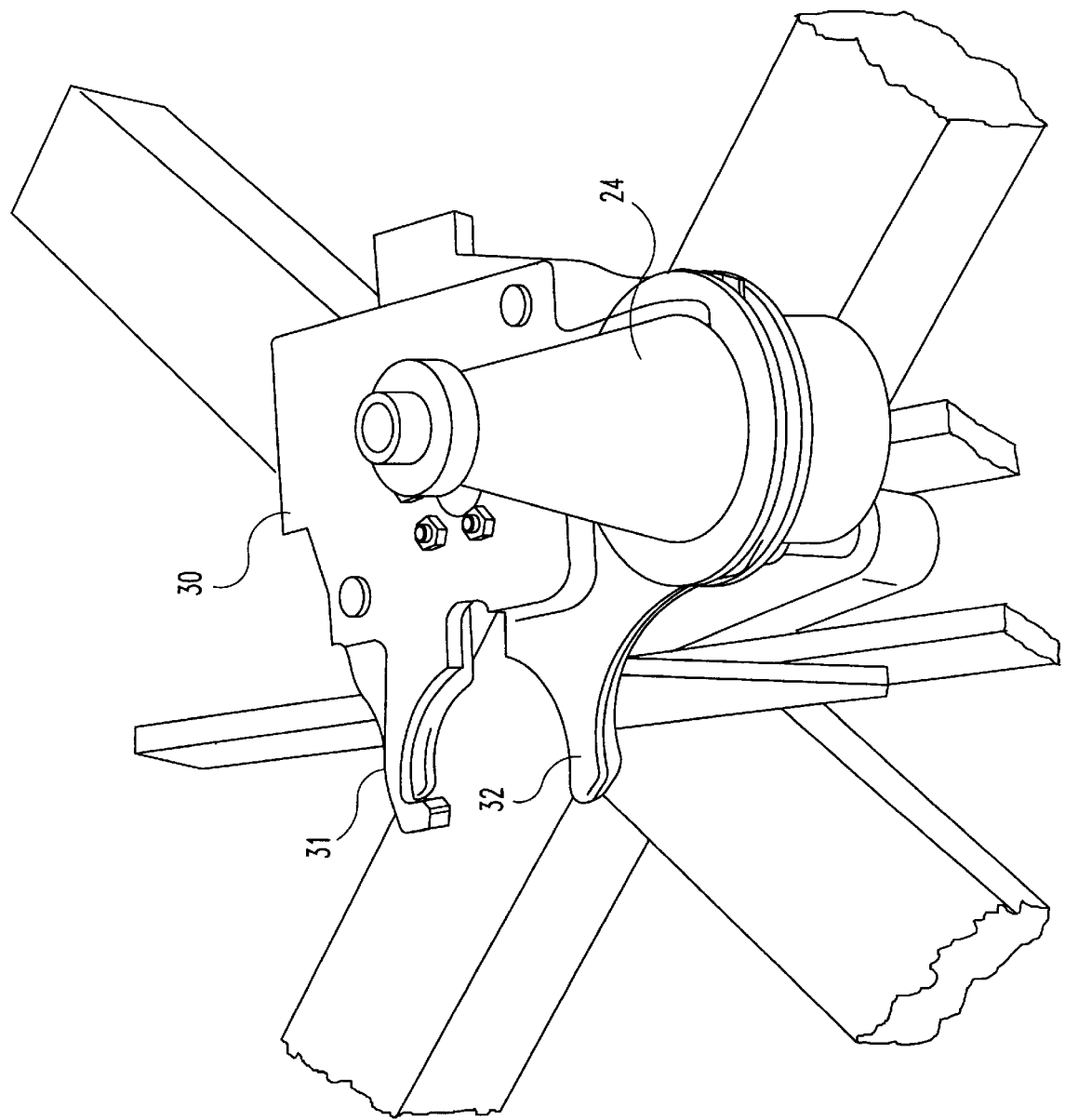
FIG. 8 is a perspective view of the movable arm with a tool in one of its ripper according to the present invention.
Figure 9:
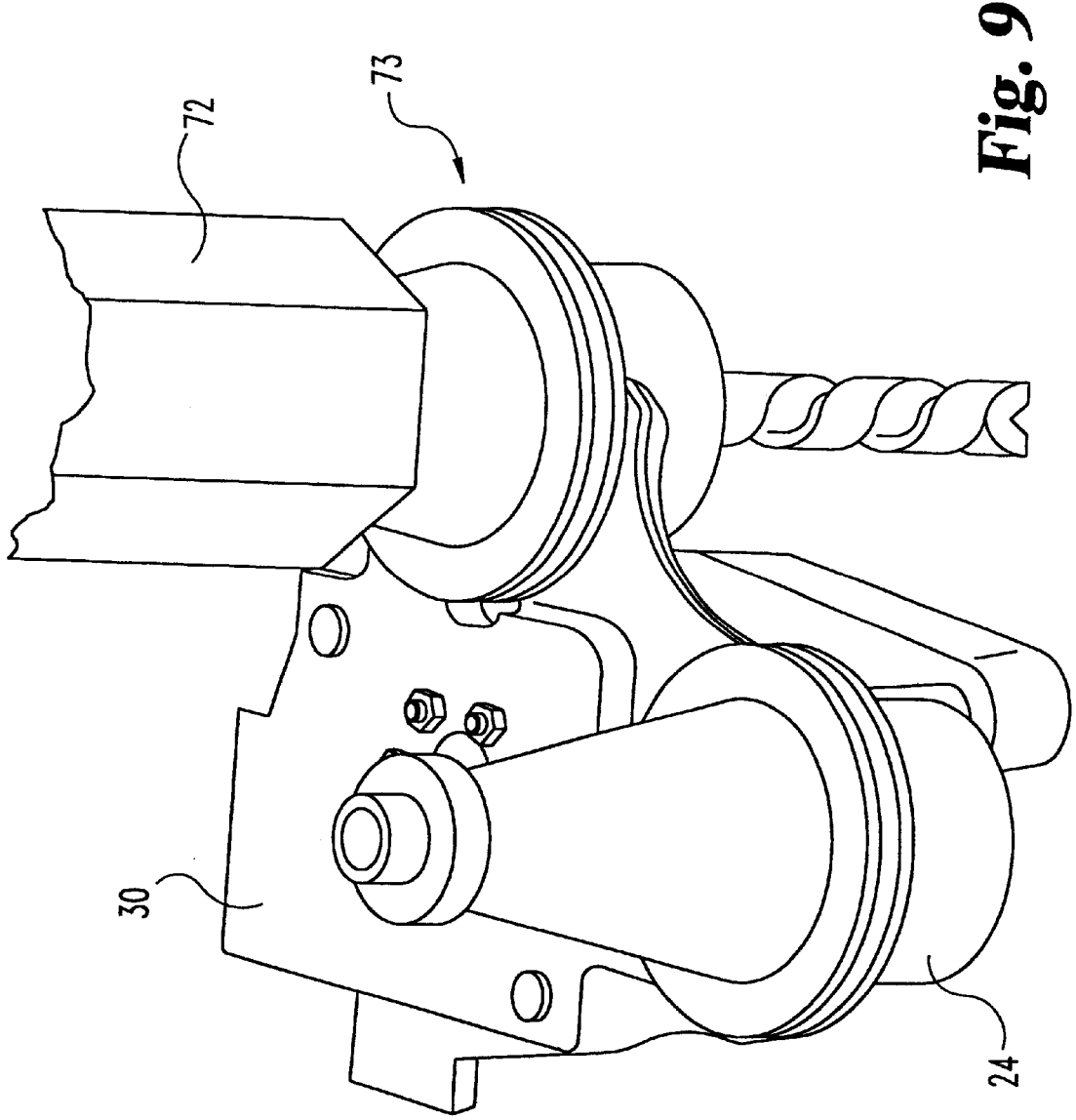
FIG. 9 is a perspective view of movable arm with a tool in the process of exchanging tool with tool in spindle in machining center according to the present invention.

Movable arm 30 is moved to a predetermined new tool 24 on the tool rack 20 from a waiting or idling position of movable arm 30 to a tool-gripping position as shown in FIGS. 6a & 6b. New tool 24 is to replace working tool 73 in spindle 72 of machining center 70. Movable arm 30 is rotated and extended so one of its grippers 31 with fingers 32 are on the sides of tool 24. Fingers 32 then collapse on tool 24 and firmly grip tool 24 as shown in FIGS. 7 & 8. Movable arm 30 is then retracted, rotated, and translated toward the location of spindle 72 in the machining center 70. At the same time, door 83 is opened so movable arm 30 can extend gripper 31, which does not have a tool, toward tool 73 in spindle 72. Movable arm 30 is stopped when fingers 32 of gripper 31 are on the sides of working tool 73 in spindle 72. Fingers 32 then collapse and firmly grip on the tool 73. Movable arm 30 then translates downward in order to extract working tool 73 from spindle 72. Movable arm 30 next rotates so gripper 31 with new tool 24 is directly underneath spindle 72. New tool 24 is then translated upward by movable arm 30 in order to insert new tool 24 into spindle 72. Gripper 31 is released and fingers 32 are no longer grip new tool 24. FIG. 9 presents tool changing steps which are discussed above. Movable arm 30 retracts to the waiting position and actuated door 83 is closed between tool changer 80 and machining center 70.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A tool changer for removal and installation of tools in a machining center having a machine tool with a spindle for holding a tool, said tool changer comprising:
   a tool rack having a plurality of locations for holding tools;
   a rotatable arm movable between said plurality of locations and a position which is capable of accessing a spindle of said machining center;
   a sensor capable of sensing the position of said rotatable arm relative to said plurality of locations; and
   a rotational mechanism including a motor, a pulley associated with the motor, a belt attached to said motor and said pulley, and a gear wheel attached to said belt;
      wherein said gear wheel has a plurality of locations, each of said locations on said wheel corresponding to one of the tools on said tool rack.

2. A tool changer of claim 1 wherein each of said locations further comprises a fork.

3. A tool changer of claim 2 wherein each of said forks has a plurality of prongs.

4. A tool changer of claim 1 wherein said movable arm has two grippers.

5. A tool changer of claim 4 wherein one of said two grippers is disposed at an angle of about 90° relative to the other of said two grippers.

6. A tool changer for removal and installation of tools in a machining center, said tool changer comprising:
   a tool rack having a plurality of locations for holding tools; and
   a rotatable arm movable between said plurality of locations for holding tools and a position whereby a tool may be installed or removed from a spindle of said machining center;
   a sensor capable of sensing the position of said rotatable arm relative to said plurality of locations; and
   a rotational mechanism including a motor, a pulley associated with the motor, a belt attached to said motor and said pulley, and a gear wheel attached to said belt;
      wherein said gear wheel has a plurality of locations, each of said locations on said gear wheel corresponding to one of the tools on said tool rack, and wherein said sensor is a limit switch associated with said tool changer for sensing one of the locations on said gear wheel.

7. A tool changer of claim 6 wherein said tool changer further comprising a rotational mechanism, which includes:
   a motor;
   a pulley associated with said motor;
   a belt attached to said motor and said pulley; and
   a gear wheel attached to said bell.

8. A tool changer for removal and installation of tools in a machining center, said tool changer comprising:
   a tool rack having a plurality of locations for holding tools; and
   a rotatable arm movable between said plurality of locations for holding tools;
   a rotational mechanism, which includes:
      a motor;
      a pulley associated with said motor;
      a belt attached to said motor and said pulley and
      a gear wheel attached to said belt;
   wherein said gear wheel has a plurality of locations, said tool changer further comprising a limit switch associated with said tool changer for sensing one of the locations on said gear wheel, with each of said locations on said gear wheel corresponding to one of the tools on said tool rack.

9. A tool changer of claim 6 wherein said movable arm further comprising a vertical mechanism for moving said movable arm vertically, said vertical mechanism includes:
   a vertical shaft associated with said movable arm; and
   a cylinder connected to said movable arm, said cylinder capable of moving said movable arm vertically.

10. A tool changer of claim 6 wherein said movable arm further comprises a horizontal mechanism for moving said movable arm laterally, said horizontal mechanism includes:
    a linear track associated with said movable arm; and
    a cylinder connected to said movable arm, said cylinder capable of moving said movable arm laterally.

11. A machining center comprising:
    a frame including a machine tool operably disposed within said frame, said machine tool including a spindle capable of holding a tool, said frame further including an access door for manually accessing tools in said tool rack is located on one side of said tool changer, said access door located proximate one of said plurality of locations and sized to allow for manual access to said one of said plurality of locations, said access door having at least one location for holding a tool;
    a tool rack having a plurality of locations for holding tools;
    a rotatable arm movable to said plurality of locations and movably proximate to said machine tool;
    a sensor capable of sensing the position of said rotatable arm relative to said plurality of locations; and
    a rotational mechanism including a motor, a pulley associated with the motor, a belt attached to said motor and said pulley, and a gear wheel attached to said belt;
       wherein said gear wheel has a plurality of locations, each of said locations on said gear wheel corresponding to one of the tools on said tool rack, and wherein said sensor is a limit switch associated with said tool changer for sensing one of the locations on said gear wheel.

12. The machining center of claim 11 further comprising a cylinder actuated door attached to one side of said tool changer, said cylinder actuated door disposed in an opening which allows for said arm to access said spindle.

13. The tool changer of claim 1, wherein said sensor is a limit switch associated with said tool changer for sensing one of the locations on said gear wheel.

\* \* \* \* \*

UNITED STATES PATENT AND TRADEMARK OFFICE
CERTIFICATE OF CORRECTION

PATENT NO.   : 6,494,821 B1                                                         Page 1 of 1
DATED        : December 17, 2002
INVENTOR(S)  : Patel et al.

It is certified that error appears in the above-identified patent and that said Letters Patent is hereby corrected as shown below:

Column 3,
Line 48, delete "lo".

Column 6,
Line 41, after the phrase "each of said locations on said" add the word -- gear --

Signed and Sealed this

Twenty-second Day of July, 2003

JAMES E. ROGAN
*Director of the United States Patent and Trademark Office*